United States Patent [19]

Moreschi

[11] Patent Number: 4,684,091
[45] Date of Patent: Aug. 4, 1987

[54] PORTABLE MUSICAL INSTRUMENT STAND

[75] Inventor: Giovanni Moreschi, Recanata, Italy
[73] Assignee: Latin Percussion, Inc., Garfield, N.J.
[21] Appl. No.: 840,769
[22] Filed: Mar. 18, 1986
[51] Int. Cl.[1] .................. A47B 97/04; F16M 11/38
[52] U.S. Cl. .................. 248/166; 248/163.1; 248/168; 248/434; 248/443; 248/460; 211/182; 403/100
[58] Field of Search .................. 248/166, 165, 163.1, 248/168, 434, 443, 528, 134, 460; 211/195, 26, 182, 85; D6/429; D17/9; 403/102, 100

[56] References Cited

U.S. PATENT DOCUMENTS

| D. 257,987 | 1/1981 | Schoenig | D6/429 X |
|---|---|---|---|
| 1,256,279 | 2/1918 | Wanamaker | 248/165 |
| 1,618,493 | 2/1927 | Thiele | 248/434 X |
| 1,883,974 | 10/1932 | Kusterle | 211/195 X |
| 1,955,509 | 4/1934 | Moeckel | 248/166 X |
| 2,029,484 | 2/1936 | Howard et al. | 403/100 |
| 2,192,830 | 3/1940 | Gerdes | 403/102 X |
| 2,550,793 | 5/1951 | Ferriera | 248/163.1 |
| 2,744,794 | 5/1956 | Sheard | 403/102 X |
| 3,294,251 | 12/1966 | Howell | 211/195 |
| 3,452,956 | 7/1969 | Reed | 211/195 X |
| 3,483,999 | 12/1969 | Barrett | 248/168 X |
| 3,563,592 | 2/1971 | Preston | 403/102 X |
| 3,960,275 | 6/1976 | Houghton et al. | 211/182 |
| 3,999,727 | 12/1976 | Rennemann | |
| 4,527,579 | 7/1985 | Knotter et al. | 403/100 X |

FOREIGN PATENT DOCUMENTS 184107 4/1907 Fed. Rep. of Germany.

Primary Examiner—Cornelius J. Husar
Assistant Examiner—Todd G. Williams
Attorney, Agent, or Firm—Collard, Roe & Galgano

[57] ABSTRACT

A portable and foldable stand for musical instruments includes a pair of spaced apart supports each including a tubular main leg having a pivot collar, a brace leg, a brace, a pin for joining one end of the brace to the brace leg, and a latch for releasably attaching the brace to the main leg. The brace leg is pivotally linked at one of its ends to the pivot collar of the main leg and is joined to one end of the brace by the pin. The other end of the brace is releasably attached to the main leg by the latch means. A pivot is joined to the main leg, and an upper segment is joined to the pivot means. At least two cross members are provided each one including a releasable clamping sleeve for releasably clamping each cross member to each support. The clamping sleeve is releasably clampable and slidable on the upper segment and the pivot, thereby linking the pair of supports.

5 Claims, 7 Drawing Figures

PORTABLE MUSICAL INSTRUMENT STAND

BACKGROUND OF THE INVENTION

The invention relates to a portable musical instrument stand. More particularly, it relates to a stand for keyboards and the like, which may be quickly and easily erected to provide a stable platform for supporting instruments, and may also be collapsed or folded into a relatively small space during transport or storage.

Performing musicians often need a stand or support to support a musical instrument, e.g., a keyboard, in a position which allows the musician an accessible and comfortable playing posture. Due to the temporary nature of most music equipment set ups, it is most desirable that such a support be capable of being erected or set up in a minimum amount of time, and without tools or special skills. In addition, such a musical instrument stand should have the ability to be folded into a small and lightweight package in order to facilitate frequent transportation between performances. Moreover, once such a stand is erected, it must be stable in order to avoid rocking or movement of the stand and the instruments mounted thereon, especially during exceptionally vigorous or enthusiastic musical performances.

While existing folding instrument stands have generally been found to be satisfactory, they have not provided all of the above mentioned features and advantages. In particular, U.S. Pat. No. De. 257,987 discloses a keyboard stand which may be folded so that its depth is significantly reduced, however, this design has a fixed height and width. In addition, U.S. Pat. No. 3,483,999 generally relates to a portable and collapsible rack which can be reduced to a compact size, but this rack requires the assembly of separate pieces or segments. Another related apparatus which is easily portable is known from German Pat. No. 184107 which discloses a lightweight folding easel. Although this easel can be folded into a compact state, it is intended to support only lightweight loads and would be unsuitable as a musical instrument stand. Finally, U.S. Pat. Nos. 3,999,727 and 3,960,275 relate to apparatus having some rack-like features, but which, of themselves, could not be used as a musical instrument stand.

Moreover, these and other musical instrument stands presently in use can often be quite time consuming and/or difficult to erect, require the use of tools, do not provide adequate support for a musical instrument, or are bulky and unadjustable thereby preventing the musical instruments mounted thereon from being positioned as desired.

Accordingly, it is an object of the present invention to provide an improved portable and foldable stand for musical instruments.

It is also an object of the invention to provide such a music stand which is simple in design, economical, of lightweight construction, quick and easy to use and erect, and which is sturdy or secure when in the erected position.

It is yet another object of the invention to provide such an improved musical instrument stand which includes a variety of adjustment features which enable a musical instrument to be easily positioned as desired.

SUMMARY OF THE INVENTION

Certain of the foregoing and related objects are readily attained in a portable and foldable stand for musical instruments which includes a pair of spaced-apart supports each comprising a tubular main leg, a tubular brace leg pivotally attached to the main leg at a connection point, and a brace pivotally attached to the brace leg and removably fixed to the main leg at a fixation point on one side of the connection point when the stand is in an erected position. An eccentrically hinged pivot point is disposed within each of the main legs on the side of the connection point opposite to the fixation point. The hinged joint has an outside diameter matching that of the main leg, and it separates the main leg into a hinged segment and a fixed segment. At least one cross member is provided and carries at least one holder pivotally mounted thereon. The cross member joins the main legs via a releasable tubular clamping sleeve at each of its ends. Each of the clamping sleeves is slidably fitted over the corresponding main leg and is releasably clampable thereon. Therefore, the main legs can pivot along their axes within the clamping sleeves, and the sleeves may also be slidably positioned over the pivot joint, thereby rigidly joining the hinged segment and the fixed segment.

Preferably, the brace leg is approximately one half of the length of the main leg, and the brace is approximately equal in length to the brace leg. Most desirably, the upper segments are only as long as need be to accommodate the number of cross members on the stand, and the lower segments are no longer than the cross members.

In a preferred embodiment, the eccentrically hinged pivot joints are primarily constructed of plastic, and the main legs, brace legs, and cross members are constructed from aluminum tubes. The bottom ends of the main legs and brace legs may also include anti-skid feet made out of rubber or plastic.

Other objects and features of the present invention will become apparent from the following detailed description when taken in connection with the accompanying drawings which disclose one embodiment of the invention. It is to be understood that the drawings are designed for the purpose of illustration only and are not intended as a definition of the limits of the invention.

BRIEF DESCRIPTION OF THE DRAWINGS

In the drawings, wherein similar reference characters denote similar elements throughout the several views.

DETAILED DESCRIPTION OF THE PREFERRED EMBODIMENT

Figure 1:
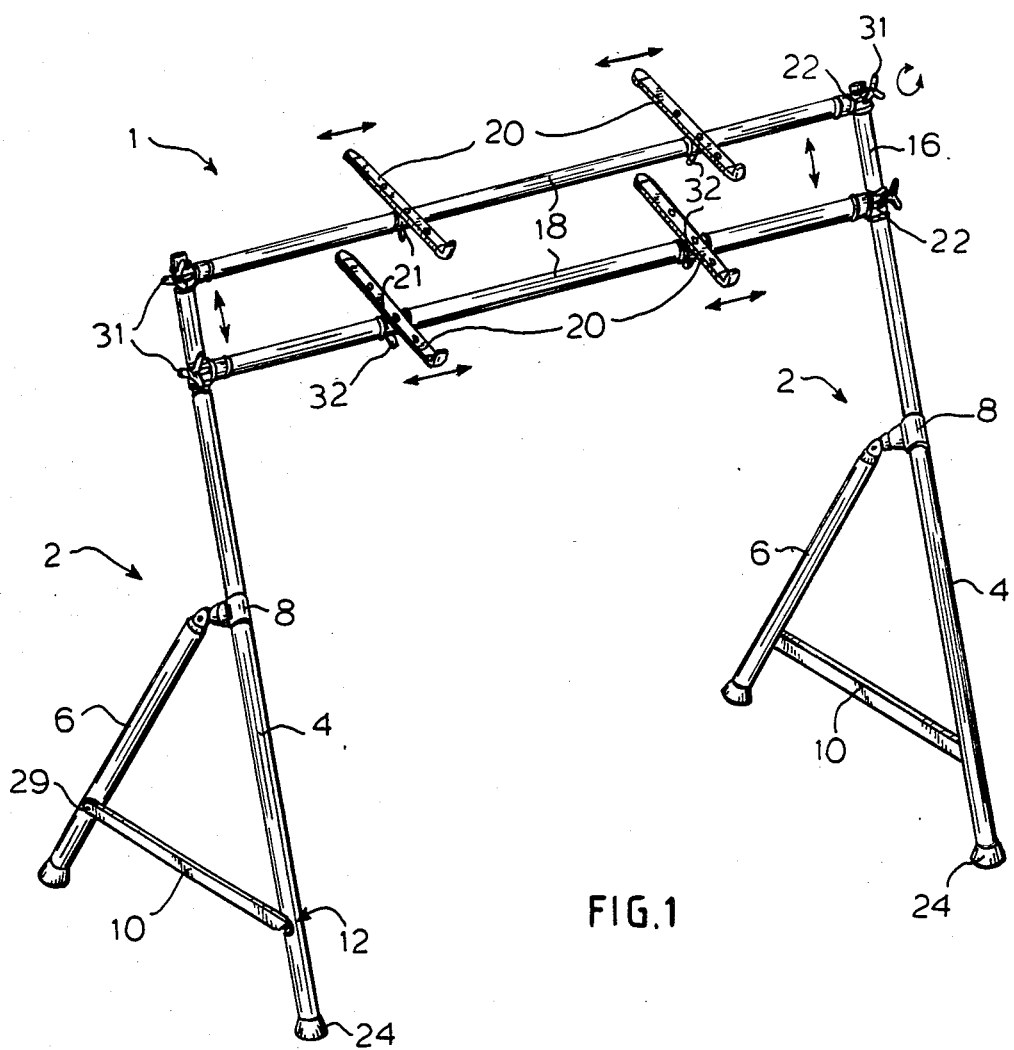
FIG. 1 is a front, side, and top perspective view of a novel musical instrument stand embodying the present invention, with the stand in a fully erected position.
Figure 2:
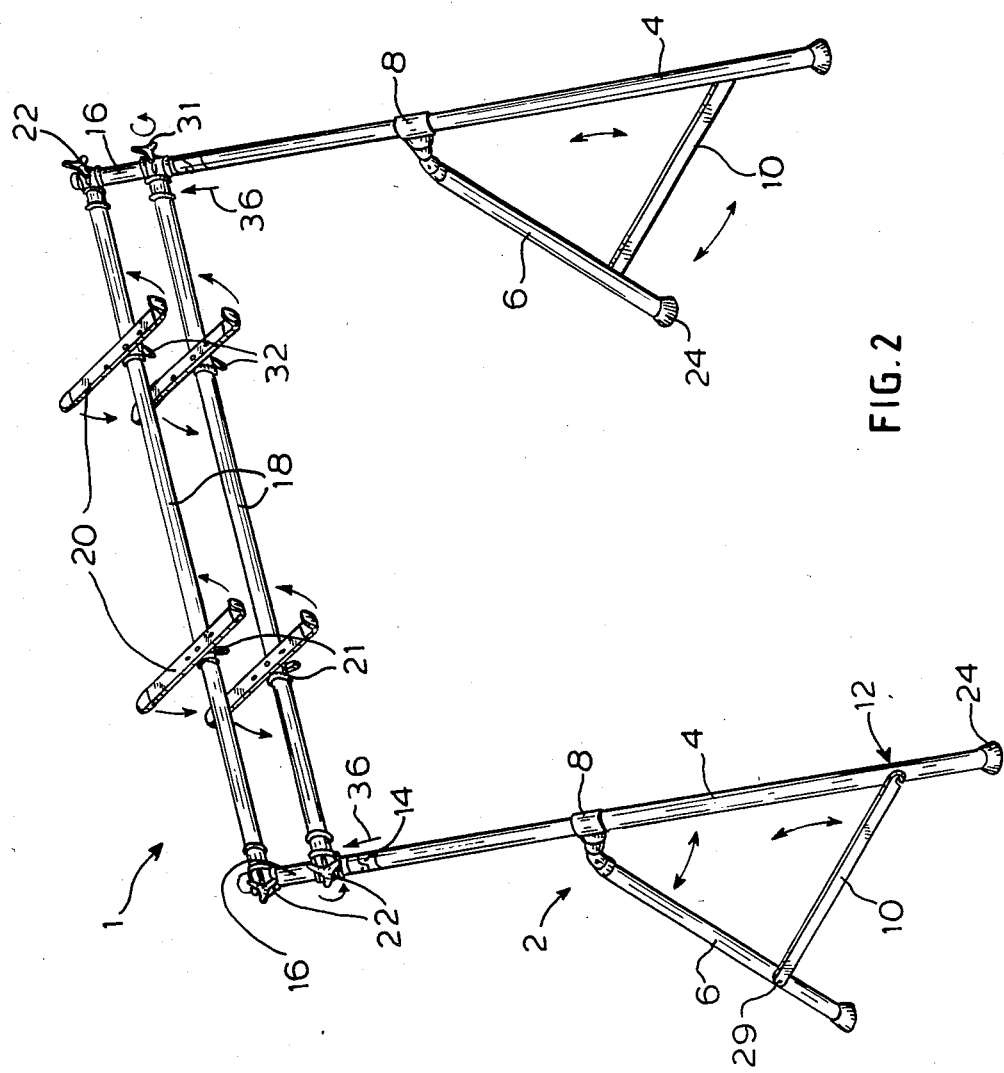
FIG. 2 is a front, top and side perspective view of the stand of FIG. 1 with the lower cross member moved upward exposing the eccentric pivot joints.
Figure 3:
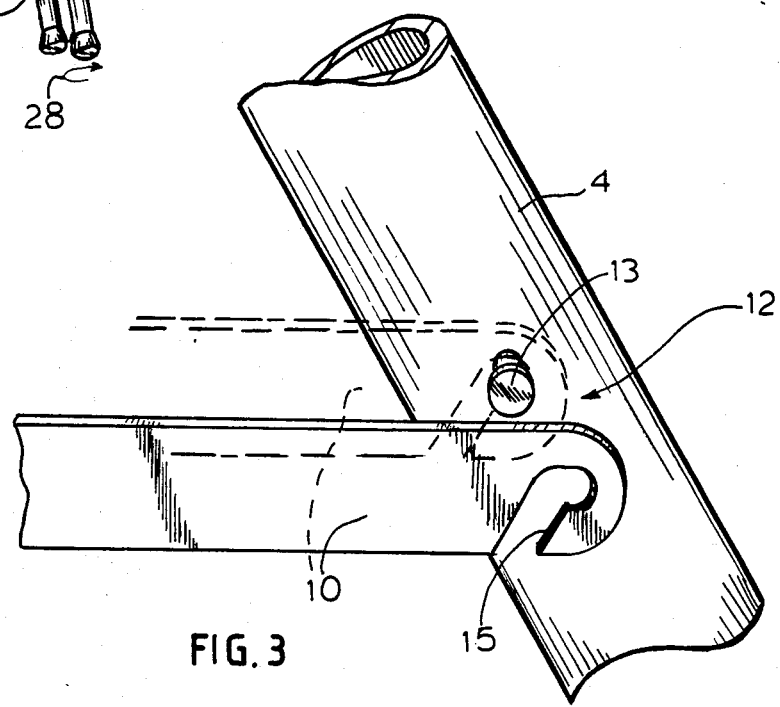
FIG. 3 is a front and top perspective view, illustrated on an enlarged scale, of the attachment of the brace to the main leg fixation point.

Referring to FIGS. 1-3, there is shown the novel musical instrument stand of the present invention including a pair of spaced-apart supports 2, which are joined together by one or more cross members 18. Each support 2 is comprised of a tubular main leg 4 and a brace leg 6 pivotally attached thereon via a pivot collar or joint 8 which in the embodiment as shown in FIG. 1 is disposed approximately along the center of main leg 4. Pivot joint 8 is securely fastened to main leg 4 and serves to allow brace leg 6 to pivot, or swing in and out with respect to main leg 4. It is not necessary that any relative movement take place between pivot collar 8 and main leg 4. A brace 10 is pivotally attached or pinned to brace leg 6 at one end by a joining means or pin 29, and is releasably latchable onto main leg 4 by way of a latch including a substantially J-shaped slot 15 and flat head 13 pin as shown in FIG. 3. The phantom lines in FIG. 3 illustrate the position of brace 10 when it is engaged on main leg 4. Slot 15 is designed such that brace 10 must undergo a forward and upward motion with respect to main leg 4 in order to disengage. This prevents brace 10 from being unintentionally separated from main leg 4. Legs 4 and 6, as well as cross members 18 are preferably made from thin walled aluminum tubes. Rubber or plastic feet 24 are included at the lower ends of legs 4 and 6, in order to prevent the legs from slipping on floor surfaces.

Figure 6:
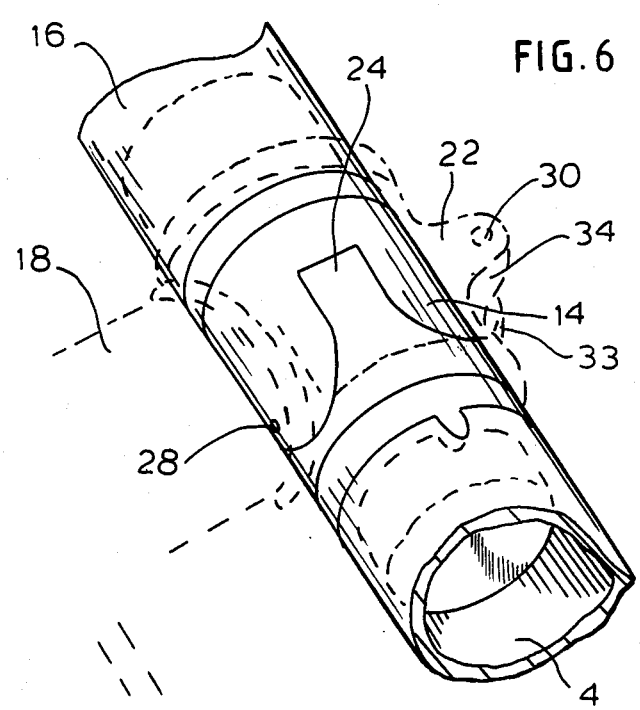
FIG. 6 is a front perspective view, illustrated on an enlarged scale, of the pivot joint with the releasably clampable sleeve positioned thereon.

Both upper and lower cross members 18 have a releasable tubular clamping sleeve 22 at each of its ends. Clamping sleeve 22 has an inside diameter which is nominally the same as the outer diameter of main leg 4, pivot joint 8, and upper segment 16, as shown in FIG. 6. In the erected position as shown in FIG. 1, clamping sleeves 22, of the lower cross member 18 are clamped over and conceal pivot joints 14, thereby causing main legs 4, to become joined to upper members 16, to form, in effect, a single rigid leg which in combination with cross member 18, forms stable stand 1. A means for releasably clamping sleeve 22, e.g., a hand-operated wing screw 31, attached to a screw thread 30 is provided in order to clamp and release sleeve 22.

There are also provided keyboard holders 20, attached to cross members 18 via clamping sleeves 21 which as shown in FIGS. 1 and 2, also have a hand-operated screw mechanism or wing screw 32 for releasably clamping the holders onto cross members 18. Sleeve 21 allows a holder 20 to be slidably positioned along the length of cross member 18, and also allows holders 20 to be rotated thereon, in order to adjust the elevation angle of the mounted musical instrument. The instrument may then be positioned either horizontally, or at an inclined angle, as desired. Holders 20 may vary in size and configuration depending on the instrument to be mounted on stand 1. In order to quickly collapse stand 1, holders 20 (as shown in FIG. 2,) are first pivoted parallel to cross-member 18.

Then wing screws 31 are turned or released so that lower cross member 18 may be displaced upwardly (as shown by arrows 36) onto upper members 16, so as to expose pivot joints 14. Moreover, braces 10, are unlatched from main legs 4, and are folded or pivoted into a position alongside brace legs 6.

Figure 4:
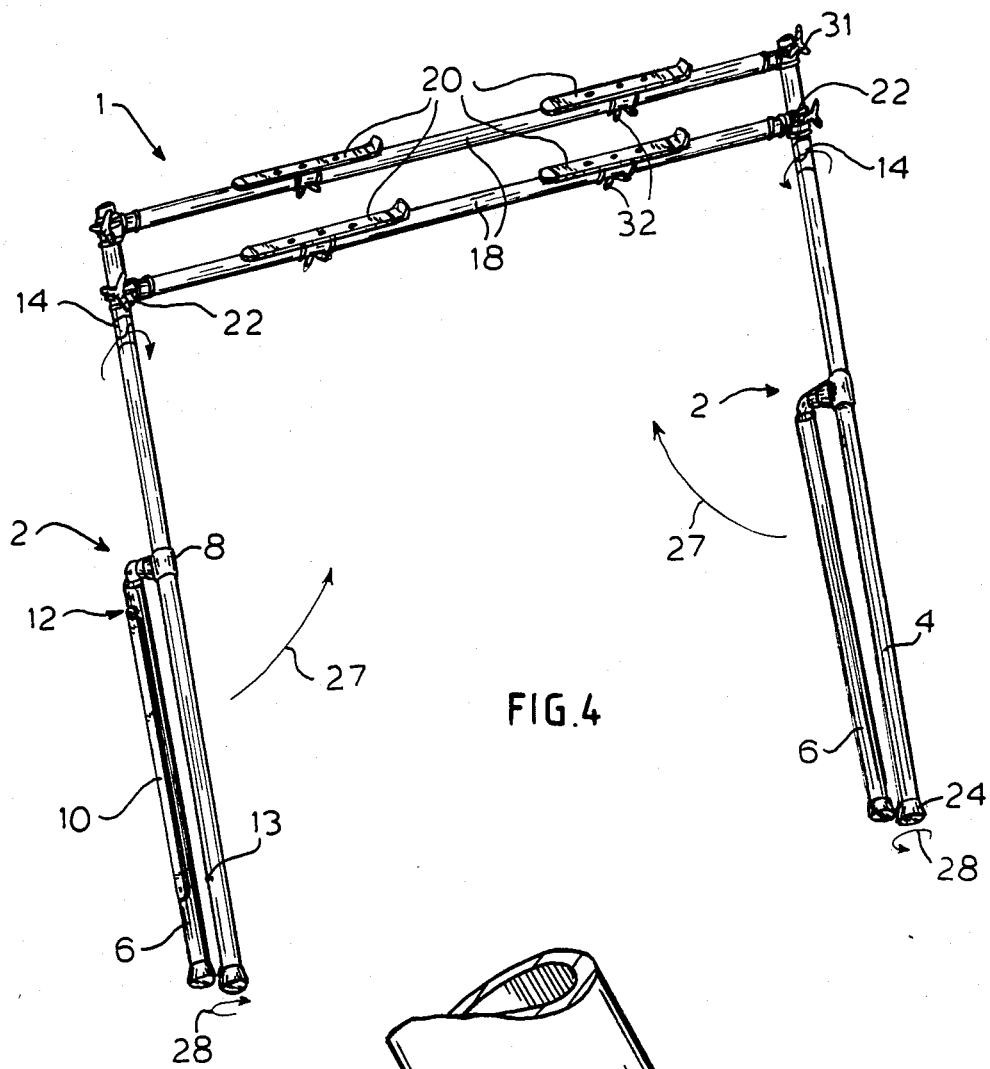
FIG. 4 is a front, top, and side perspective view of the stand of FIG. 1 in the folding sequence position following that of FIG. 2.

Continuing in the folding sequence, FIG. 4 illustrates the stand with braces 10 disengaged and folded against brace legs 6, which have been pivoted into a folded position alongside main legs 4. Cross member 18 with sleeves 22 has been disposed upwardly exposing joints 14. In addition, the wing screws of the clamping sleeves of upper cross member 18, have been loosened or released sufficiently in order to allow main legs 4 and upper segments 16 connected to them via joints 14 to be pivoted or rotated approximately 90° (as shown by arrows 28) so that the hinge pin of joints 14 extends perpendicular to the cross members, and so that main legs 4 of supports 2 may be folded into a position alongside and approximately parallel to cross member 18, as illustrated by the arrows 27 in FIG. 4, indicating the direction of movement of the legs 4.

Figure 5:
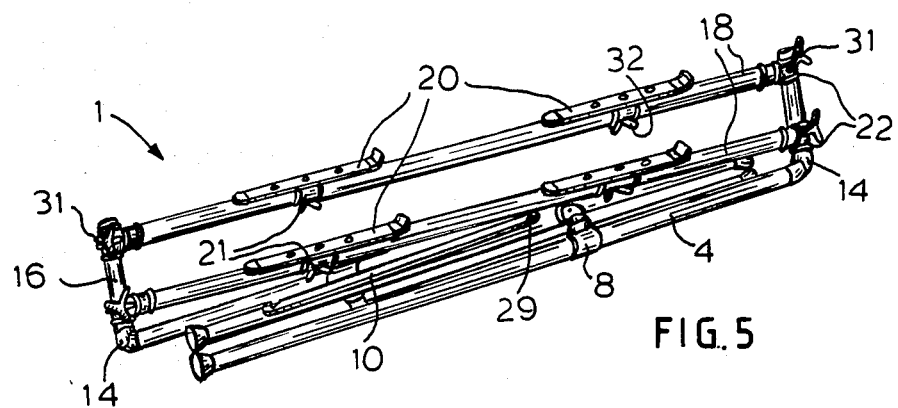
FIG. 5 is a front, top and side perspective view of the stand of FIG. 1 in its fully folded or collapsed position.

FIG. 5 illustrates the stand in the fully folded or collapsed position. The stand as shown in FIG. 5 may be readily stored or transported. A strap or band may optionally be placed around the stand in this folded condition to facilitate carrying and to prevent the legs from inadvertantly unfolding. In order to erect the stand from the folded position, the sequence of the previously described steps is reversed. However, as previously described, in order for the stand to be stable in the erected position, sleeves 22 must be positioned and clamped over joints 14, thereby immobilizing the joint and providing a sturdy stand structure.

The interaction between clamping sleeve 22 and pivot joint 14 is illustrated in FIG. 6 wherein sleeve 22 is shown in phantom positioned over joint 14 and clamped thereon. Sleeve 22 has an inside diameter or bore which is slightly larger than the outside diameter of upper segment 16, joint 14, and main leg 4 (these elements all having the same outside diameter). Therefore, sleeve 22 may be readily and quickly clamped onto joint 14 by a clamping means, e.g., a wing screw 31 on sleeve 22 when the stand is to be erected. Similarly, when the stand is to be taken down, sleeve 22 can be released from joint 14 and pushed upwardly so that it slides onto upper segment 16. In the embodiment shown, sleeves 22 are split ring clamps having wing screw 31 connected to a threaded shank 30 in order to close jaws 33 and 34 over joint 14.

Figure 7:
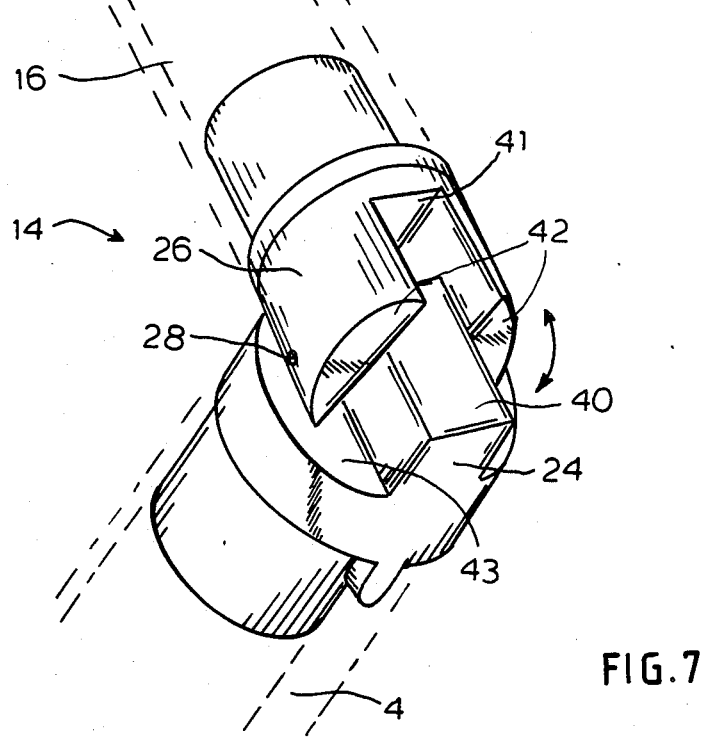
FIG. 7 is a front perspective view of the pivot joint of FIG. 6, with the joint in the folded position.

FIG. 7 illustrates joint 14 in the folded position, as it would appear when the stand is in the position shown in FIG. 5. Joint 14 basically includes a clevis 26 attached to upper member 16, and a lug 24 attached to main leg 4. Clevis 26 has two symmetrical side members with generally planer ends 42, separated by a planer middle surface 41. Lug 24 correspondingly includes two symmetrical side recesses also with planer surfaces 43, separated by a middle protrusion having a planer end 40. Clevis 26 and lug 24 are pivotally joined by a pivot pin 28 which is laterally offset from the centerline of the joint, thereby causing clevis 26 and lug 24 to be eccentrically pinned together. Therefore, when joint 14 is unfolded, recess surfaces 43 pivot toward and then directly abut clevis ends 42, and similarly, protrusion end 40 correspondingly moves inbetween ends 42 to directly abut middle surface 41. When sleeve 22 is positioned over joint 14 and clamped in place thereon, these abutting surfaces are, in effect, locked together, providing a very rigid connection between upper member 16 and main leg 4. The abutting surfaces eliminate any looseness or play from the joint and provide for a very stable instrument stand.

It should also be apparent that other variations may be made by those skilled in the art. For example, although the clamping sleeves 22 in the present embodiment utilize a wing screw as a clamping means, the same effect may be obtained by using, e.g., a hose clamp apparatus, or a lever actuated clamp. Thus, while only a single embodiment of the present invention has been shown and described, it will be obvious that many changes and modifications may be made thereunto, without departing from the spirit and scope of the invention.

Thus, while several embodiments have been shown and described, it is obvious that many changes and modifications may be made thereunto, without departing from the spirit and scope of the invention.

What is claimed is:

1. A portable and foldable stand for musical instruments, comprising:
   a pair of spaced apart parallel tubular main legs;
   a pair of brace legs each having one end pivotally attached to each of said main legs;
   a pair of brace arms each releasably coupled to each of said main legs and said brace legs adjacent their opposite end for maintaining said brace legs in an open position with respect to said main legs;
   latch means for releseably attaching each of said brace arms to each of said main legs;
   pivot means joined to the end of each of said main legs;
   at least one cross member for receiving and supporting said musical instruments,
   releasable clamping means disposed on each end of said at least one cross member comprising a split ring collar having two jaws, one of which includes a threaded shank and the other having a wing screw engaged into said threaded shank for releasably clamping said cross member to each main leg, said clamping means releasably clampable and slidable on each of said main legs, thereby linking said pair of main legs so that the stand may be placed into the erected position by attaching each of said brace arms to each of main legs with said latch means and by positioning and securing each clamping means at each end of of said at least one cross member on each main leg or over said pivot means thereby providing a rigid connection between said parallel main legs to create a stable stand;
   a tubular upper leg segment joined to each of said pivot means and having a diameter substantially similar to each of said tubular main leg and a length at least the length of said split ring collar, so that the stand may be folded by detaching said brace arms from said main legs, releasing said clamping means on said cross member, sliding said clamping means of said cross member off of each of said main legs and said pivot means onto said upper leg segment, and folding said main leg of each support toward said cross member.

2. The stand according to claim 1, wherein said pivot means comprises a clevis and a lug pivotally joined by an eccentrically disposed pivot pin passing through said clevis and lug.

3. The stand according to claim 1, further comprising keyboard holders releasably and pivotally attached to at least one of said cross members.

4. The stand according to claim 1, wherein said latch means comprises a flat head pin protruding from said main leg, and a substantially J-shaped slot in said brace adjacent to said other end of said brace.

5. The stand as recited in claim 1, wherein during the folding of the stand, said main legs are rotated so that said brace legs substantially face each other.

* * * * *